(12) United States Patent
Salmon

(10) Patent No.: US 6,566,460 B1
(45) Date of Patent: May 20, 2003

(54) CONTINUOUS RECOVERY OF POLYMER FROM A SLURRY LOOP REACTOR

(75) Inventor: Emigdio J. Salmon, League City, TX (US)

(73) Assignee: Equistar Chemicals, LP, Houston, TX (US)

( * ) Notice: Subject to any disclaimer, the term of this patent is extended or adjusted under 35 U.S.C. 154(b) by 256 days.

(21) Appl. No.: 09/632,723

(22) Filed: Aug. 4, 2000

(51) Int. Cl.$^7$ .................................................. C08F 2/14
(52) U.S. Cl. ............................ 526/64; 526/61; 526/70; 526/348.7; 526/348; 422/132
(58) Field of Search ....................... 526/64, 70, 61, 526/348.7, 348; 422/132

(56) References Cited

U.S. PATENT DOCUMENTS

| | | |
|---|---|---|
| 2,943,082 A | 6/1960 | Cottle |
| 3,152,872 A | 10/1964 | Scoggin et al. |
| 3,172,737 A | 3/1965 | Whittington |
| 3,203,766 A | 8/1965 | Mudd et al. |
| 3,242,150 A | 3/1966 | Scoggin |
| 3,248,179 A | 4/1966 | Norwood |
| 3,293,000 A | 12/1966 | Marwil |
| 3,324,093 A | 6/1967 | Alleman |
| 3,374,211 A | 3/1968 | Marwil et al. |
| 3,428,619 A | 2/1969 | Hawkins et al. |
| 3,451,785 A | 6/1969 | Rohlfing et al. |
| 3,594,356 A | 7/1971 | Hinton |
| 3,639,374 A | 2/1972 | Stryker, Jr. |
| 3,816,383 A | 6/1974 | Stotko |
| 4,113,440 A | 9/1978 | Klaasen |
| 4,121,029 A | 10/1978 | Irvin et al. |
| 4,199,546 A | 4/1980 | Kirch |
| 4,424,341 A * | 1/1984 | Hanson et al. ............. 528/501 |
| 4,448,539 A | 5/1984 | Burgert |
| 4,613,484 A | 9/1986 | Ayres et al. |
| 5,183,866 A | 2/1993 | Hottovy |
| 5,314,579 A | 5/1994 | Sung |
| 5,455,314 A | 10/1995 | Burns et al. |
| 5,575,979 A | 11/1996 | Hanson |
| 5,597,892 A | 1/1997 | Hanson |

FOREIGN PATENT DOCUMENTS

| | | |
|---|---|---|
| EP | 0 432 555 A3 | 6/1991 |
| EP | 0 432 555 A2 | 6/1991 |
| EP | 0 891 990 A2 | 1/1999 |
| EP | 0 891 990 A3 | 11/1999 |
| WO | WO 99/47251 | 9/1999 |

OTHER PUBLICATIONS

Hawly's Condensed Chemical Dictionary, edited by Richard J. Lewis, John Wiley and Sons, Inc. 1997, p. 325.*

* cited by examiner

Primary Examiner—David W. Wu
Assistant Examiner—William K. Cheung
(74) Attorney, Agent, or Firm—William A. Heidrich

(57) ABSTRACT

An apparatus and method for continuously removing polymer from a pressurized loop olefin polymerization reactor containing a slurry of polymer particles and fluids. The slurry is continuously discharged from polymer-rich zones of the reactor and enters one or a series of non-cyclonic flash vessels, in which the particles separate from the fluid. The flash vessel has a conical bottom in which a minimum level of polymer is maintained for a dynamic seal between the inlet and outlet.

20 Claims, 2 Drawing Sheets

US 6,566,460 B1

CONTINUOUS RECOVERY OF POLYMER FROM A SLURRY LOOP REACTOR

BACKGROUND OF THE INVENTION

1. Field of the Invention

The invention relates to an apparatus and method for recovering solids from a polymer-diluent slurry withdrawn from an olefin polymerization reactor.

2. Description of the Prior Art

Polyolefins, for example polyethylene and polypropylene, are commercially produced in different types of reactors including solution, slurry, stirred-bed and gas phase systems. In slurry systems, an inert diluent liquid circulates within a continuous pipe loop which may be oriented vertically or horizontally. The olefin and catalyst are fed to the reactor and the resulting solid polymer forms a slurry. Because the accumulating product must be withdrawn while still maintaining the high pressure and temperature in the reactor, engineers have continued to seek improvements in polymer removal from a slurry reactor.

U.S. Pat. No. 3,242,150 to Scoggin teaches a conventional means for removing solid polymer from a vertical loop slurry reactor. Solid polymer accumulates in a small-diameter tube or settling leg extending from the lower side of the loop reactor. The polymer then exits through a valve which periodically opens fully and closes. Scoggin also discloses a two-valve arrangement by which a bottom valve is closed and an upper valve opens to trap polymer product therein, then the upper valve is closed and the bottom valve opens to allow the polymer to escape toward the product recovery zone.

U.S. Pat. No. 3,816,383 to Stotko describes a process for separating the solid olefin polymer from liquid diluent by passing the slurry through a cyclone separator, removing an overflow stream from the separator concentrated in the liquid diluent, removing an underflow stream from the separator concentrated in the solid polymer, combining the overflow with the residual underflow, and recycling the resulting mixture to the reactor, thus avoiding blockage in the separation system.

U.S. Pat. No. 3,639,374 to Stryker, Jr., teaches a polymerization system by which a catalyst enters a reactor containing liquid propylene to form a polymer slurry within the reactor. The slurry then exits to a cyclone separator at a percent solid content of approximately 50–60 percent whereby the propylene diluent flashes from the polymer product.

Separation of the polymer from the accompanying liquids and gases can be accomplished in single or multiple-stage processes. U.S. Pat. No. 5,575,979 and its divisional U.S. Pat. No. 5,597,892 to Hanson describe a method for recovering solids from a polymer-diluent slurry in a two-stage method. The diluent vaporizes from the polymer slurry in a first cyclonic flash vessel, then exits to be condensed and recycled to the reactor. The polymer solids pass into an extended solids reservoir of the cyclonic flash vessel until it is at least partially full and thereafter pass to a non-cyclonic second flash vessel to vaporize residual diluent.

BRIEF SUMMARY OF THE INVENTION

In one aspect the invention relates to a method of continuously removing polymer from a pressurized loop polymerization reactor containing a slurry of polymer particles and liquids, and an apparatus suitable for this method. A slurry of polymer particles is continuously conveyed from polymer-rich zones of the reactor through a discharge means and a transfer line. The slurry enters a non-cyclonic flash vessel maintained at a lower pressure, whereupon the particles separate and settle to the bottom of the flash vessel. In one embodiment, more than one flash vessel is employed. The flash vessel has vertical sidewalls and a conical bottom in which a minimum level of polymer is maintained for a dynamic seal.

BRIEF DESCRIPTIONS OF THE DRAWINGS

FIG. 1 briefly shows an embodiment which describes a loop reactor containing polyethylene in a hydrocarbon diluent kept in constant circulation by pump with desired amount of polymer which is continuously withdrawn via a discharge port through a line to a flash vessel.

DETAILED DESCRIPTION OF THE INVENTION

Figure 1:
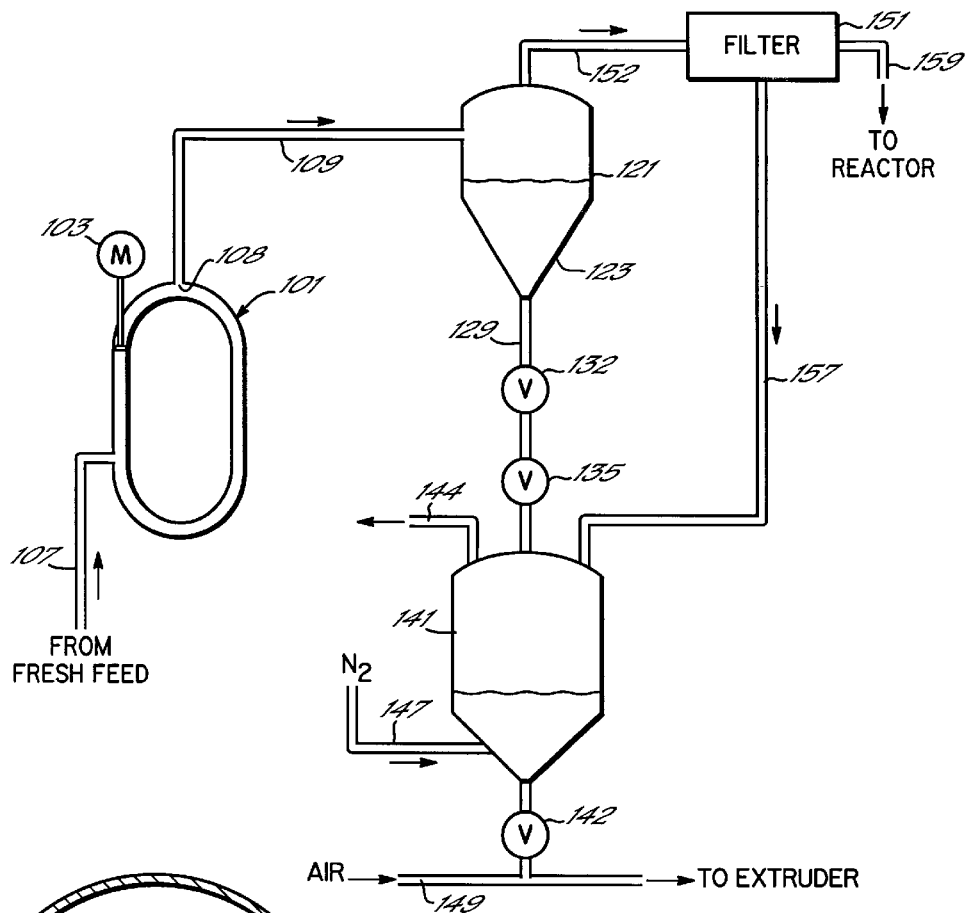

The present invention relates to an improved apparatus and method for separating and removing liquid from the solid polymer product in a slurry exiting an olefin polymerization reactor. Those skilled in the art will recognize, however, that the invention applies to different polymerization systems involving monomers, comonomers, diluents, reactor types and process conditions other than those specifically exemplified below.

The invention is especially applicable to slurry loop polymerization systems, typically an endless loop of pipe. One example is a vertical loop reactor such as that used in the Phillips high density polyethylene process. A second example is a horizontal loop reactor such as the so-called "Petro" reactors developed and originally licensed by National Petro Chemicals.

Slurry loop reactors operate at high temperatures and elevated pressures typically greater than 400 psia, often greater than 600 psi. Particular conditions are chosen based on the diluent and the reactants.

In typical practice, polymer slurry is periodically removed in small batches through lines and a series of valves which serve to isolate the severe conditions in the reactor from the downstream equipment. Intermittent withdrawal of polymer slurry leads to periodic oscillations in reactor pressure. In typical control schemes, fresh feedstock and diluent are fed in response to the pressure drop resulting from withdrawal of product. In other words, feed is introduced to maintain reactor pressure at set point. This system makes it difficult to operate without oscillations in reactor conditions or reactant concentrations, which affects product quality and consistency. We have found that a continuous polymer withdrawal system diminishes these reactor operating variations.

Continuous, rather than batch, withdrawal of polymer can be advantageously applied to many types of polymerization reactors, including vertical and horizontal slurry loop reactors.

In horizontal loop reactors such as Petro reactors the location of the polymer withdrawal system in the loop has not heretofore been seen as critical. Polymer slurry containing, for example, about 30 weight percent solids could be withdrawn from any convenient point along the reactor loop then sent to a hydrocyclone to be separated into a solids-rich portion (about 40% solids) and a solids-lean portion (about 20% solids). The solids-rich portion would be conveyed to a flash vessel while the solids-lean portion would be returned to the reactor. However, the ability of a hydrocyclone to process a higher weight percent solids stream without blockages was seen as a limitation to substantially increasing the solids concentration in the effluent stream from the reactor. This also had the effect of limiting operation at higher solids concentration in the reactor.

In its general aspects, the invention also relates to improvements in the type, location, configuration and operation of a continuous polymer withdrawal system.

We have noted that the slurry circulating within a horizontal loop reactor is not uniform. A significant differential in the concentration of polymer solids exists or can be created between certain locations, and efficiencies can be achieved by particular placement of the polymer discharge means.

Although a horizontal loop reactor is oriented substantially in the horizontal plane it is typically tilted by less than ten degrees, preferably less than five degrees; more preferably about one to two degrees. This tilt provides a high point where gases can accumulate and be withdrawn during the reactor filling step. We have discovered additional benefits by locating the polymer discharge means at or near the lowest point of the reactor.

We have further discovered the advantage of withdrawing polymer from a solids-rich zone that exists relatively close to the intake and relatively distant from the discharge of the reactor-circulating pump. In this zone, upstream of the pump, there is stagnation or relatively minimal linear velocity of the polymer particles. Preferably this zone is also sufficiently distant from the suction end of the pump or impeller to avoid any turbulent mixing. This solids-rich zone is, for example, 10 to 40 feet, preferably 10 to 20 feet, upstream from the pump.

For maximal efficiency, the polymer discharge point on a pipe oriented horizontally should be below the horizontal midline of a cross-section of the pipe, i.e. below a plane intersecting the axis of the pipe, preferably at the six-o'clock or lowest position. Polymer particles tend to settle as gravity overcomes the horizontal motion created by the reactor-circulating pump. The solids concentration at the bottom of the loop pipe can be a few percentage points higher than the concentration at the midpoint plane of the pipe.

The polymer particles being formed are suspended in the diluent by maintaining circulative velocity of about thirty (30) feet per second within the continuous horizontal loop. As the polymer concentration increases, circulative velocity can be increased to overcome the tendency of the particles to settle due to gravity. The reactor can thus be operated to control the settling rate, thus conveniently providing a means to concentrate the polymer. The speed of the reactor circulation pump can be adjusted by means of variable speed or steam turbine drives, for example.

Those in the art will recognize that varying reactor fluid velocity in this way can be used as an overall control of particle settling rate independently of factors such as the particle size, weight, and particle size distribution. If the fluid velocity is too low, the polymer particles can settle prematurely which can result in reactor operating problems. If the fluid velocity is too high, there will be no polymer solids concentration gradient. This operating parameter can be used to overcome the effect of different polymer particle sizes and distribution.

The fluid velocity speed may be varied such that adequate circulation is maintained while establishing a concentration gradient of polymer solids between the 12 o'clock and six o'clock positions of the reactor cross-section. Adjustments may be made in response to densitometer readings at one or more points within the reactor. The advantages of a polymer solids concentration gradient may be obtained by varying the speed of the reactor circulating pump.

When the reactor is operated in one or more of the ways described above, the polymer tends to concentrate in a solids-rich zone. A reactor discharge nozzle or takeoff is advantageously located at this solids-rich zone to remove the polymer product, as the removal of a concentrated polymer stream is preferred over the removal of a dilute stream. Surprisingly, we have found in one instance that the concentration of solids downstream of the reactor discharge nozzle control valve was 40% higher than that in the reactor itself. The slurry in the reactor optimally has a weight percent solids concentration of at least 30 percent, preferably 40 percent or more.

The reactor discharge means can be as simple as a line with a valve to restrict flow to the desired rate. The discharge means should allow for streamlined flow of the polymer slurry without any points of stagnation or retarded flow. The distance between the reactor and the flash vessel is preferably minimized, and sharp bends and sticking points are avoided. This will reduce the opportunity for continued polymerization and heat loss while the polymer is being conveyed through the discharge means and the transfer line.

With reference to FIG. 1, a loop reactor 101 contains polyethylene in a hydrocarbon diluent kept in constant circulation by pump 103. Fresh feed, typically monomer, co-monomer, catalyst and additional diluent, enter the reactor via multiple lines which are represented here by line 107. A desired amount of the polymer is continuously withdrawn via discharge port 108 through line 109 to flash vessel 121. The amount withdrawn is dependent upon the reactor conditions and the polymer production rate. In a preferred control scheme, the fresh monomer is added to the reactor at a constant rate, and flow through the discharge means is controlled by a valve 112 in response to reactor pressure. Thus the rate of polymer discharge may vary, but it is continuous rather than intermittent or cycling.

In a preferred embodiment, a stream of polymer slurry at a concentration of 30–50 % or more solids is continuously discharged from the loop reactor into a high pressure flash vessel where it is flashed from an operating pressure between 635 to 675 psia, preferably about 655 psia (about 640 psig) to near 20–25 psia (about 5–10 psig). The physical location of the reactor discharge nozzle is at the bottom of the pipe (6 o'clock position) and upstream of the suction of the reactor circulating pump.

Figure 2:
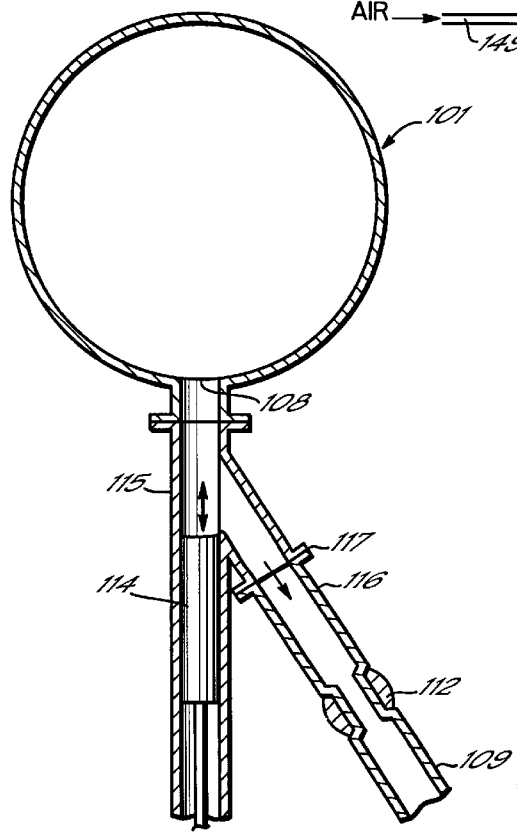
FIG. 2 shows a cross-sectional view of the reactor loop and one embodiment of an apparatus.

FIG. 2 shows a cross-sectional view of the reactor loop 101 and one embodiment of an apparatus at port 108 to allow continuous withdrawal of a predetermined amount of polymer slurry from the reactor. During start-up of the reactor and normal operation of the reactor, valve 112 permits flow of slurry through line 116. Valve 112 is adjustable and automatically controls reactor set pressure. For example, as fresh feed is added to the reactor, valve 112 opens to increase the discharge and thus maintain constant pressure.

If line 116 becomes plugged from accumulated polymer, it can be isolated from the reactor. This may be accomplished by a second valve such as a Straham valve having a piston 114 which can move within housing 115 between a first position flush with the reactor inner wall and a second position below the entry to line 116.

Continuous withdrawal has certain advantages. Plugging is minimized as the flow of polymer does not stagnate even though polymerization may continue in this line. Continuous withdrawal also allows the reactor to be maintained at a steady state pressure without the fluctuations seen with cycling discharge systems, which can cause the reactor pressure to vary by at least 10 and often 20 psig or more. Product quality can improve from more stable process conditions and a more constant concentration of reactants, as the ethylene flowrate to the reactor remains nearly constant.

The apparatus for this invention can be adapted from existing designs for either horizontal or vertical olefin polymerization reactors. A polymer discharge means should be located on the reactor below the horizontal midline of a cross-section of the reactor pipe. The flash vessel should preferably be non-cyclonic with vertical sidewalls in an upper section and the polymer in the sidewall. A transfer line connects the reactor discharge means and the inlet of the flash vessel. The flash vessel should have a conical bottom section to promote good flow of polymer particles to the outlet in the bottom section. An exit line with a valve leaves the flash vessel outlet.

EXAMPLE 1

Discharge Nozzle

This example illustrates one aspect of the invention incorporating a specific reactor discharge nozzle on a horizontal loop "Petro" reactor used for ethylene polymerization in an isobutane diluent.

FIG. 1 shows reactor 101 and the location of discharge port 108 about 15 feet upstream from reactor circulating pump 103, near the lowest point of the reactor. FIG. 2 is a cross-section of reactor 101 at that location which is a 24-inch OD pipe. Discharge port 108 is a three-inch Schedule 80 pipe extending about six inches in the six-o'clock position to a flange. This port and the apparatus below it are collectively referred to as the reactor discharge nozzle.

Slurry from the reactor 101 enters the discharge nozzle through port 108, then continues through valve housing 115 and into line 116, a five-foot length of three-inch Schedule 80 pipe. Line 116 is connected at one end to flange 117 and at the other end to control valve 112. This valve is normally partially open and restricts the flow of polymer slurry through line 116. Valve 112 is sized for a flow of about twice the expected production of the reactor, and here is a two-inch Fisher Controls model VA1052-V200-3610J flanked by two reducers. This restriction significantly reduces the flow velocity to approximately 10 feet per second compared to about 30 feet per second in the reactor. This reduction in flow velocity causes additional concentration of polymer solids in the discharge nozzle compared to the concentration in the reactor. A three-inch line 109 then extends from valve 112 to the polymer recovery area.

The Straham air cylinder operated drain valve is normally open as shown in FIG. 2 to allow flow of polymer into line 116. When desired, such as during reactor maintenance or pluggage of line 116, valve piston 114 can move upward about 12 inches within housing 115 so that it is flush with the inner wall of reactor 101. The cylinder head is preferably ground to match the curvature of the reactor wall.

EXAMPLE 2

Single-stage Flash

In this embodiment of the invention, the polymer slurry is discharged to a single-stage flash vessel.

Referring to FIG. 1, the slurry from reactor 101 continuously flows through line 109 to a non-cyclonic flash vessel 121 that has vertical sidewalls in the upper section and a conical bottom 123 with an angle of about 60 degrees or greater. Vessel 121 is approximately 12 feet in diameter and about 20–25 feet high. The slurry enters at a high velocity tangentially to the vessel sidewall via an inlet in the upper portion. The flash vessel operates at a temperature of about 100–120° F. and 5–10 psig. The polymer particles disengage from the gas and accumulate into the conical bottom of vessel 121.

In order to form a dynamic seal between flash vessel 121 and downstream lines and vessels, a level controller (not shown) keeps a minimum powder level in vessel 121, preferably at or above the top of the conical section. The level controller operates one or more valves to expel polymer through discharge line 129 when the level rises. Valve 132 can be a ball valve while valve 135 is a rotary valve. Alternatively, valves 132 and 135 can each be ball valves in series operated out of phase.

If desired, the polymer powder is then sent to a purge vessel 141 via line 129 where it is contacted with nitrogen fed via line 147 to an internal distributing ring, sparger or similar device. Residual hydrocarbon is stripped from the polymer and exits with the nitrogen via line 144. Polymer powder exits vessel 141 through line 149 controlled by rotary valve 142 discharging into a pneumatic conveying system leading to an extruder (not shown).

Other process advantages are obtained by recycling the overhead stream from flash vessel 121. The overhead stream in line 152 consisting of ethylene, isobutane and other light gases pass through bag filter 151 to remove any entrained polymer particles, then continues through line 159 where it is compressed, cooled to about 120° F. and liquefied to be pumped back to the reactor. This stream is relatively free of contaminants and can be reused in the polymerization without any additional treatment. In filter 151 entrained particles larger than 200 microns are removed and returned via line 157 to flash vessel 141.

The process as practiced commercially can include other conventional equipment and operations which are known to those in the art but are not shown or discussed herein.

EXAMPLE 3

Multiple-stage Flash

An alternate embodiment described below is similar to that in Example 2 but with the inclusion of an intermediate flash vessel to let down the pressure in two stages.

Figure 3:
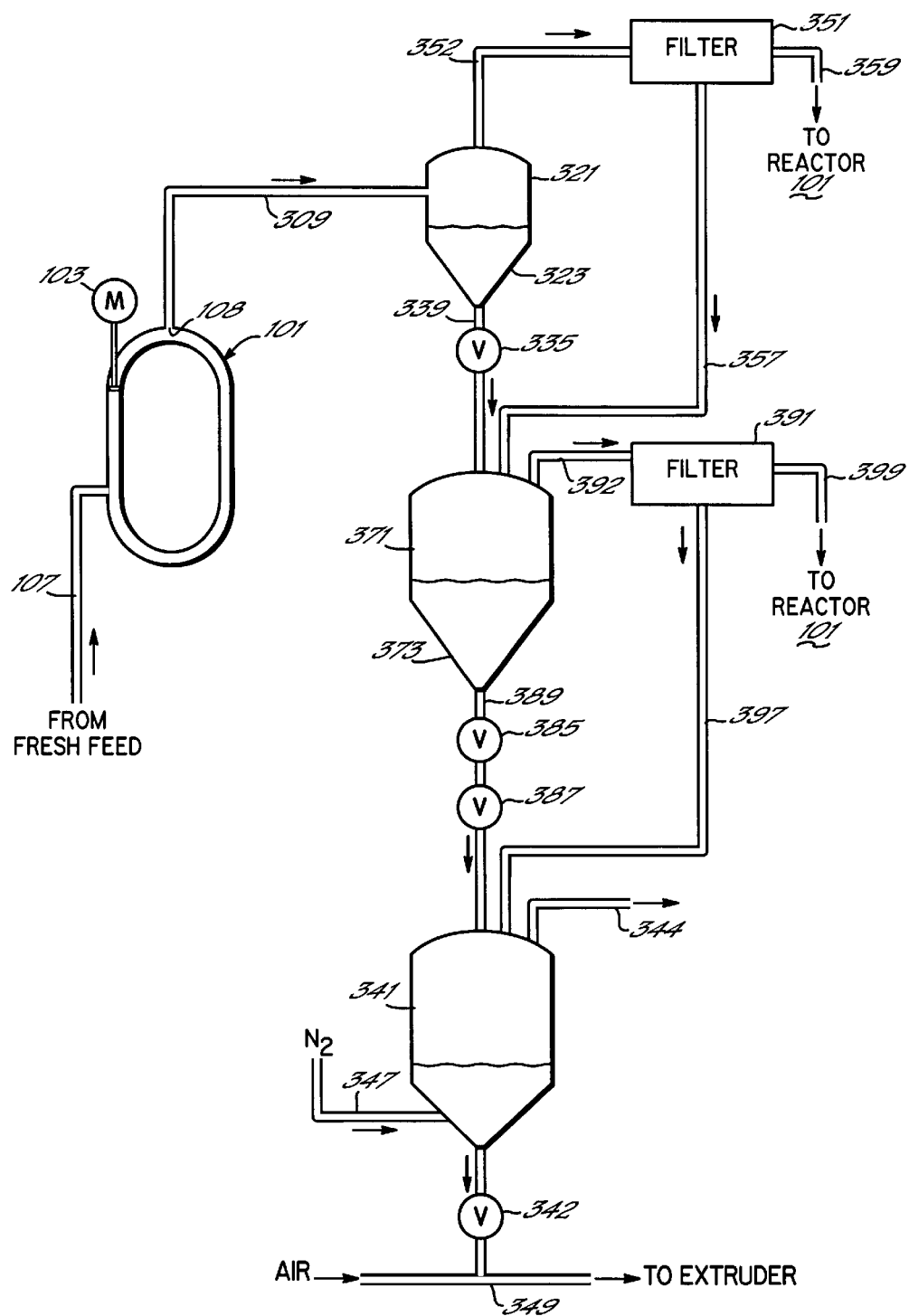
FIG. 3 shows an alternate embodiment which describes the inclusion of an intermediate flash vessel to let down the pressure in two stages.

Referring to FIG. 3, the reactor operation and slurry take-off are as described in Examples 1 and 2. The slurry enters high-pressure non-cyclonic flash vessel 321 where the pressure is approximately 220 psig. An overhead stream consisting of ethylene, isobutane and lights exits via line 352 through bag filter 351 to remove any entrained polymer particles, continues through line 359 and is cooled and liquefied in a heat exchanger (not shown). A portion of "lights" can be vented before the stream is pumped back to the reactor; no compressor is needed.

Vessel 321 can be about six feet in diameter and ten feet high, tangent to tangent. Polymer powder accumulates in lower section 323 which is conical at an angle of at least about 60 degrees. Control of rotary valve 335 in line 339 in response to a minimum level of polymer powder in vessel 321 provides a dynamic seal between vessel 321 and downstream vessels, similar to that described in Example 2. A substitute for rotary valve 335 could be two ball valves in series operated out of phase.

The polymer powder then flows through line 339 then enters low-pressure non-cyclonic flash vessel 371 operating at approximately 5 to 10 psig. Vessel 371 can be about 12 feet in diameter and 26 feet high, tangent to tangent. The overhead stream 392 from vessel 371, containing primarily ethylene and isobutane, goes through bag filter 391 to capture polymer particles entrained in that stream and return them via line 397 to purge vessel 341 (described later). A gaseous stream 399 is compressed to approximately 220 to 230 psig, condensed, and then returned to the reactor.

The polymer in vessel 371 discharges via line 389 while ball valve 385 and rotary valve 387 (or alternatively, two ball valves) are operated to retain a minimum polymer level in conical lower section 373 of vessel 371. The polymer powder then preferably enters a purge vessel 341 operating at approximately 2 to 3 psig. Nitrogen added via line 347 removes the last few traces of hydrocarbon via line 344. Polymer powder then exits vessel 341 through line 349 controlled by rotary valve 342 preferably discharging into a pneumatic conveying system leading to an extruder (not shown).

One advantage of a two-stage system is the ability to condense the overhead vapors, e.g., exiting via line 399 from the intermediate vessel 371, by cooling in a heat exchanger without the necessity for compression. The condensed liquids are conveniently returned to the reactor.

EXAMPLE 4

Process Simulation

The process described in Example 2 was simulated using commercially-available process software for a case assuming a polymer production rate of fifty thousand pounds per hour.

Referring again to FIG. 3, the slurry exits the reactor through line 309 at 104,650 pounds per hour, of which 50,000 pounds is polymer with the majority of the remainder being isobutane diluent (53,100 lbs) and ethylene. Conditions at the reactor discharge 108 are about 207° F. and 660 psia with a flow of 2057 cubic feet per hour.

The slurry in high-pressure flash vessel 321, at approximately 187° F. and 240 psia, exits via line 339 at a flow of 856 cubic feet per hour. The 50,000 pounds of polymer flows through line 339 each hour together with about 24,359 lbs isobutane and 100 lbs ethylene.

The temperature in flash vessel 371 and purge vessel 341 is about 116° F., while the pressure drops from 20 psia to 18 psia between the two vessels.

I claim:

1. A method of continuously obtaining polymer product from an olefin polymerization reactor comprising an endless loop of pipe, the method comprising:
   circulating within the loop a slurry of polymer particles and liquids while maintaining the reactor at a first pressure above 400 psia;
   continuously conveying an amount of the polymer particles from the reactor first through a discharge means located below a horizontal midline of a cross-section of the reactor pipe and then through a transfer line; and
   receiving the polymer particles at the inlet of a non-cyclonic primary flash vessel having vertical sidewalls and a conical bottom and maintained at a second pressure less than 25 psia, whereupon the particles settle to the bottom of the flash vessel.

2. The method of claim 1 in which the reactor is a horizontal loop reactor.

3. The method of claim 2 in which the discharge means is located upstream of a reactor-circulating pump in the reactor.

4. The method of claim 3 in which the discharge means is located from 10 to 40 feet upstream of a reactor-circulating pump in the reactor.

5. The method of claim 1 in which the first pressure is above 600 psia.

6. The method of claim 2 in which the first pressure is from 635 to 675 psia and the liquids include isobutane and ethylene.

7. The method of claim 1 including controlling the flow through the discharge means in response to the pressure of the reactor, and adding fresh olefin feedstock to the reactor at a constant rate.

8. The method of claim 7 in which the reactor is a horizontal loop reactor.

9. The method of claim 7 in which the reactor is a vertical loop reactor.

10. The method of claim 1 in which the particles enter the non-cyclonic primary flash vessel at a tangent to the vertical sidewall in the upper half of the vessel.

11. The method of claim 1 further comprising removing a portion of the polymer particles via an outlet at the bottom of the flash vessel while retaining an amount of particles sufficient to maintain a dynamic seal between the inlet and the outlet of the vessel.

12. The method of claim 1 in which the reactor is a vertical loop reactor.

13. The method of claim 12 in which the particles enter the non-cyclonic primary flash vessel at a tangent to the vertical sidewall in the upper half of the vessel.

14. The method of claim 12 further comprising removing a portion of the polymer particles via an outlet at the bottom of the flash vessel while retaining an amount of particles sufficient to maintain a dynamic seal between the inlet and the outlet of the vessel.

15. The method of claim 14 in which polymer particles are removed while maintaining a level which fills the conical bottom of the vessel.

16. The method of claim 12 including the additional step, before the polymer particles enter the primary flash vessel, of receiving the polymer particles at the inlet of an intermediate non-cyclonic flash vessel with an upper section having vertical sidewalls and the inlet being tangential to the sidewall, a conical bottom with an outlet therein, and operated at a third pressure intermediate between the first and second pressures.

17. The method of claim 16 in which the first pressure is above 600 psia and the third pressure in the intermediate flash vessel is above 180 psia, and the second pressure in the primary flash vessel is below 25 psia.

18. A method of continuously obtaining polymer product from an olefin polymerization reactor comprising an endless loop of pipe, the method comprising:
   circulating within the loop a slurry of polymer particles and liquids while maintaining the reactor at a first pressure above 400 psia;
   continuously conveying an amount of the polymer particles from the reactor first through a discharge means located below a horizontal midline of a cross-section of the reactor pipe and then through a transfer line;
   receiving the polymer particles at the inlet of a non-cyclonic primary flash vessel having vertical sidewalls and a conical bottom and maintained at a second pressure less than 25 psia, whereupon the particles settle to the bottom of the flash vessel; and
   including the additional step, before the polymer particles enter the primary flash vessel, of receiving the polymer particles at the inlet of an intermediate non-cyclonic flash vessel with an upper section having vertical sidewalls and the inlet being tangential to the sidewall, a conical bottom with an outlet therein, and operated at a third pressure intermediate between the first and second pressures.

19. The method of claim 18 in which the first pressure is above 600 psia and the third pressure in the intermediate flash vessel is above 180 psia, and the second pressure in the primary flash vessel is below 25 psia.

20. A method of continuously obtaining polymer product from an olefin polymerization reactor comprising an endless loop of pipe, the method comprising:

circulating within the loop a slurry of polymer particles and liquids while maintaining the reactor at a first pressure above 400 psia;

continuously conveying an amount of the polymer particles from the reactor first through a discharge means located below a horizontal midline of a cross-section of the reactor pipe and then through a transfer line;

receiving the polymer particles at the inlet of a non-cyclonic primary flash vessel having vertical sidewalls and a conical bottom and maintained at a second pressure less than 25 psia, whereupon the particles settle to the bottom of the flash vessel;

removing a portion of the polymer particles via an outlet at the bottom of the flash vessel while retaining an amount of particles sufficient to maintain a dynamic seal between the inlet and the outlet of the vessel and maintaining a level which fills the conical bottom of the vessel.

* * * * *